Aug. 30, 1955      F. M. FORD      2,716,323
ROTATING CUTTING ASSEMBLY
Filed July 6, 1953      2 Sheets-Sheet 1
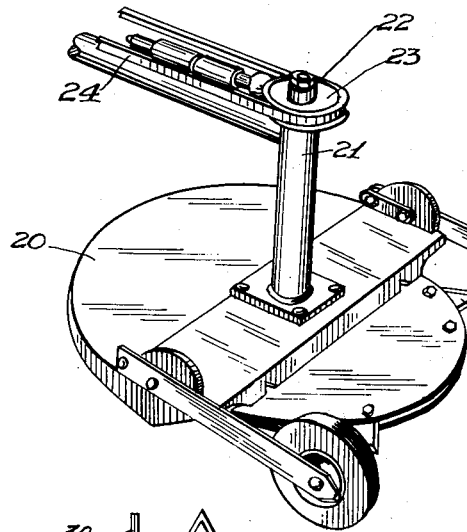
Fig.1
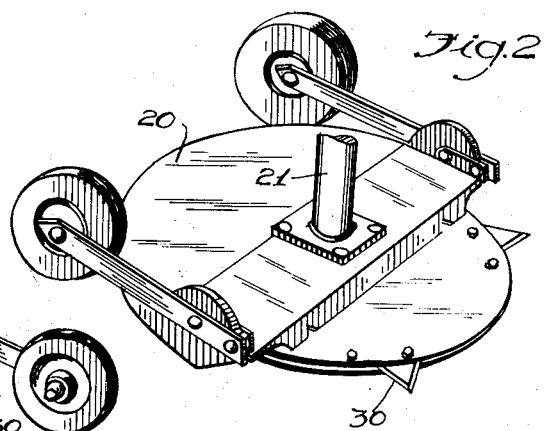
Fig.2
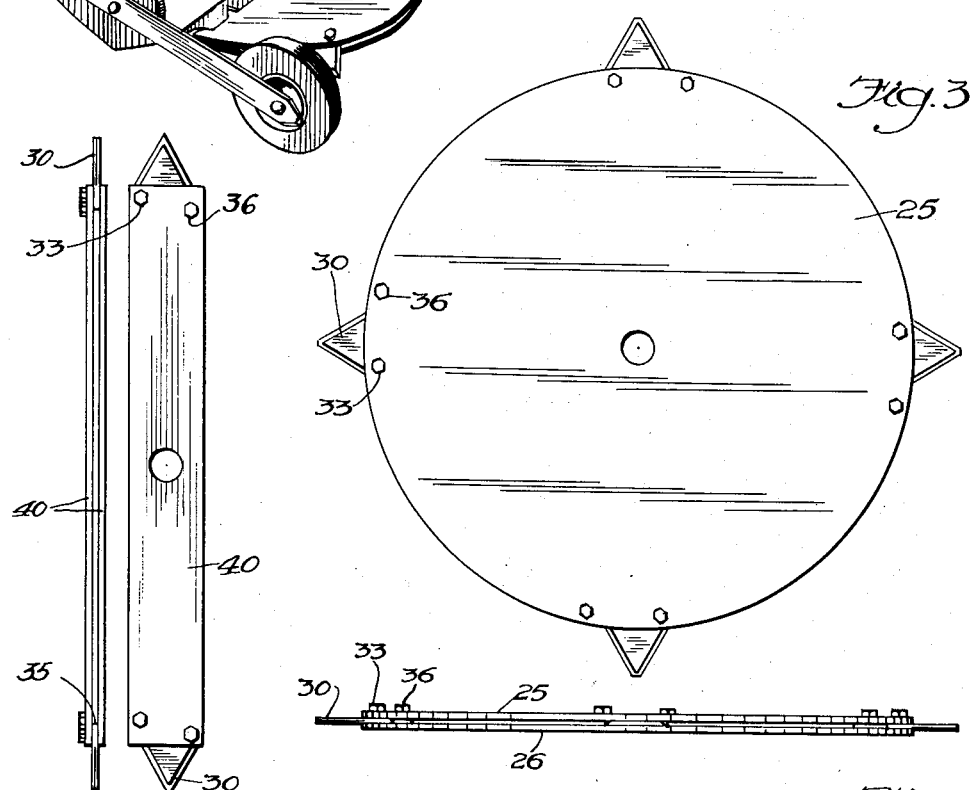
Fig.3
Fig.4
Fig.6     Fig.5
INVENTOR.
F. M. Ford
BY
Stevens & Batcheler
Attorneys.

Aug. 30, 1955 F. M. FORD 2,716,323
ROTATING CUTTING ASSEMBLY
Filed July 6, 1953 2 Sheets-Sheet 2
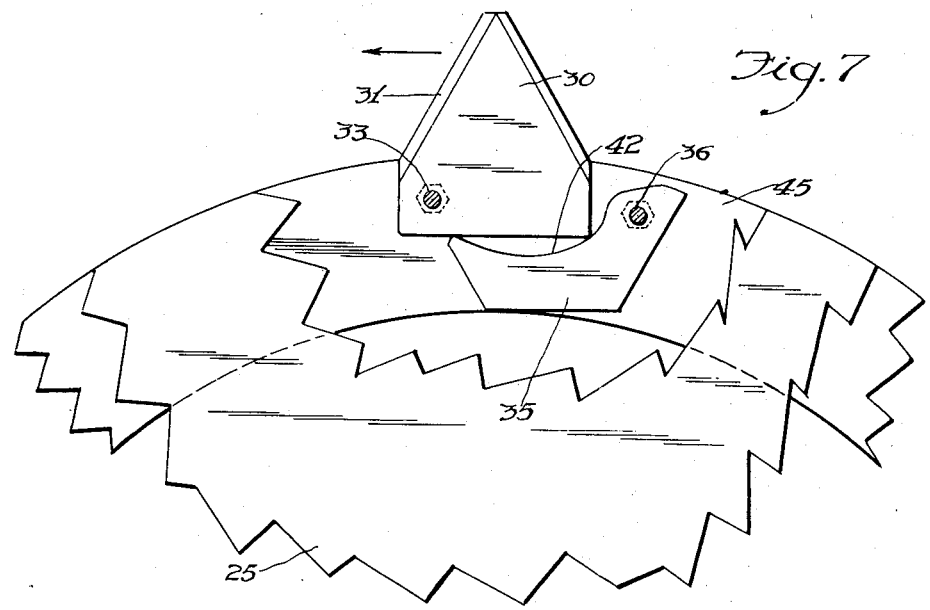
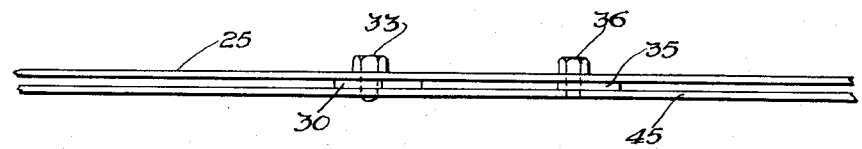
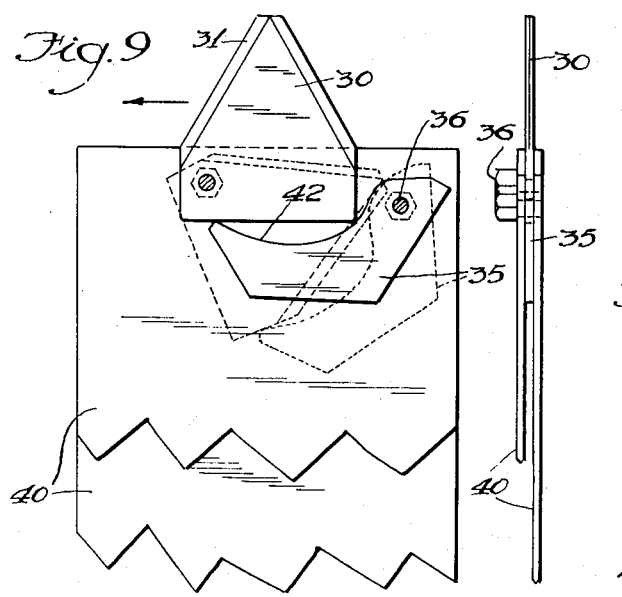
INVENTOR:
F. M. Ford
BY
Stevens & Batchelor
Attorneys.

United States Patent Office 2,716,323
Patented Aug. 30, 1955

2,716,323

ROTATING CUTTING ASSEMBLY

Foster M. Ford, Morris, Ill.

Application July 6, 1953, Serial No. 366,289

2 Claims. (Cl. 56—295)

My invention relates to lawn mowers in the form of a hand cart and projecting a cutter unit in a frontal position close to the ground. More particularly, the invention deals with the cutter units and the manner in which a series of blades is connected with the same, and one object of the invention is to provide a cutter unit which is of the horizontal disc form and equipped with a series of blades and means for allowing the recession of the same in case the blades meet an obstruction.

A further object is to mount each blade of the cutter unit on a pivot, whereby to facilitate the folding of the blade to a point even with or inwardly of the periphery of the disc carrying the same in case the blade encounters an obstruction.

Another object is to provide a backing element for the blade which keeps it in the projected position normally, but yields to the folding action of the blade in order to allow the same to clear an obstruction during the rotation of the cutter unit.

An additional object is to design a cutter mechanism which is simple and easily adjustable by the average person.

With the above objects in view, a better understanding of the invention may be had by reference to the accompanying drawings, in which—

Fig. 1 is a perspective view of a cutter unit employing the novel blade, and showing a pair of frontal supporting units;

Fig. 2 is a similar view, showing the supporting wheels folded back;

Fig. 3 is an enlarged top plan view of a disc assembly, showing a series of blades mounted therein;

Fig. 4 is an elevational view of the showing in Fig. 3;

Fig. 5 is a modification of the disc assembly in Fig. 3, illustrating a bar assembly employing only two blades;

Fig. 6 is an edge view of the showing in Fig. 5;

Fig. 7 is a top plan view, partly broken away, of a fragment of a disc and ring assembly employing the improved blade;

Fig. 8 is an elevational view of the showing in Fig. 7;

Fig. 9 is an enlargement of the upper portion of Fig. 5, partly broken away, and showing the normal and altered positions of a blade and a backing element therefor; and Fig. 10 is an elevational view of the showing in Fig. 9.

In accordance with the foregoing, specific reference to the drawings indicates the frame for a typical cutter unit at 20, such frame having an upstanding bearing 21 journaling the shaft 22 of the cutter unit; and such shaft carries a pulley 23 receiving a belt drive 24 from the power unit (not shown) of the mower.

Mowers of the type considered usually employ a single disc underneath the frame 20, such disc being rotatable in a horizontal plane or with a tilt toward one side or the other when the mower is adjusted accordingly. In the present embodiment, however, I choose to employ an assembly of two discs 25 and 26, these being superimposed in spaced relation. With the discs so positioned, it is possible to insert a series of blades 30 between the discs along the peripheries thereof.

Fig. 7 shows more clearly that each blade 30 is of generally triangular form, with its sides 31 chamfered to an edge. The blade is perforated in one of its inner corner portions to receive a bolt 33 which is first driven through the disc 25, then through the blade, and finally screwed into a disc 45 to an extent permitting the blade to pivot about the bolt when subjected to inward pressure. A substantially crescent-shaped backing plate 35 is disposed behind the other inner corner portion of the blade 30, the outer end portion of the backing plate receiving a bolt 36 applied to the discs 25 and 45, and to the backing plate 35 in a manner identical with the bolt 33, except that the bolt 36 is driven to the extent of securing the backing plate with a considerable degree of tightness. It is understood that the closing pressure of the discs when the bolts are driven imposes surface friction on the blades and backing plates, so that the blades will at no time be free to become projected by centrifugal force.

The manner of mounting the blade 30 and backing plate 35 as just described applies not only to the disc type of cutter, but also to a type employing a pair of flat bars 40, with a blade mounted at the ends thereof. Fig. 9 illustrates the action of a blade and its backing plate in the event the blade strikes an obstruction. The arrow in Fig. 9 shows the direction in which the blade is carried; and, under normal conditions, the right-hand inner corner portion of the blade bears against a concave track 42 forming the outer edge of the backing plate, the latter forming, to all intents and purposes, a solid abutment for the corner of the blade under consideration. However, should the leading edge of the blade encounter an obstruction, the blade would pivot about the bolt 33 in a clockwise direction, bearing with its right-hand inner corner portion on the track 42 of the backing plate 35, so that the blade eventually assumes the folded position indicated by dotted lines, and the backing plate the lateral position indicated similarly. Whether the cutter is of the bar type using two blades, or of the disc type using four or more blades, all blades fold in case of the eventuality mentioned, so that the cutter continues to rotate without strain or shock to the running gear.

When the cutter blades undergo the aforesaid folding action, the mower obviously idles without any effect on the grass or weeds encountered; or it may speed up in view of the idling condition. In either event, the operator has notice of the change; and the blades may be attended to by first stopping the rotation of the motor. It will be evident from Fig. 9 that each blade may be swung back to its working position because of its pivotal mounting on the bolt 33. However, the bolt 36 must be loosened slightly in order that the backing plate 35 may be positioned or driven back to its normal position, the bolt 36 then being tightened. This simple operation in the case of each blade is sufficient to restore the same to working position.

While the assembly of the discs 25 and 26, as shown in Figs. 3 and 4, makes for a sturdy unit, it is possible to replace the disc 26 with a ring 45 which will serve the purpose of the disc 26 insofar as the blades and backing plates are concerned. The modified construction is intended to save material and weight.

It will now be apparent that the novel cutter unit is constituted to operate without incident when normal grass or weed cutting is in process. However, when a snag, root or other obstruction interferes with the progress of the blades, the novel cutter saves the running gear of the mower from shock or injury by having its blades readily foldable to a position within the periphery of the part carrying the blades, so that the cutter unit will clear the obstruction. The folding of the blades operates against a set of backing plates which are normally fixed, but yieldable in case of strong resistance to the progress of the blades; and the blades and backing plates may be restored to normal positions quickly with a simple wrench. Also, the blades may be set in the fully projected positions when weeds or stalks, growing in soft ground, are to be cut. However, where grass grows in ground strewn with pebbles, gravel or stones, it is best to set the blades near to the disc peripheries, so that they will shear the grass without tendencies to throw the pebbles or stones. Further, the pressure of the discs will contribute to the retention of the blades in any position of adjustment. It is significant that the yieldable blade feature is accomplished by the use of two very simple elements, which are made of plate or sheet metal and bolted to the carrier of the cutter unit. It is therefore feasible to produce a cutter unit having the advantages set forth, and replacements provided, at minimum cost.

While I have described the invention and its modification along specific lines, various minor changes or refinements may be made therein without departing from its principle, and I reserve the right to employ all such changes and refinements as may come within the scope and spirit of the appended claims.

I claim:

1. A cutter unit for lawn mowers comprising a rotatable support, a series of blades normally projected in radial positions from the support, each blade being widened to form inner corner portions, a pivot attaching one corner portion to the support, a backing element carried by the support in relation to the other corner portion, and means disposing the backing element firmly as against normal resistance encountered by the blade and yieldably in case abnormal resistance forces the blade to pivot inwardly and bear with said other corner portion against the backing element, the latter being a plate having an arcuate track opposite said other corner portion, and said means comprising a pivot attaching the plate to the support.

2. A cutter unit for lawn mowers comprising a rotatable support, a series of blades normally projected in radial positions from the support, each blade being widened to form inner corner portions, a pivot attaching one corner portion to the support, a backing element carried by the support in relation to the other corner portion, and means disposing the backing element firmly as against normal resistance encountered by the blade and yieldably in case abnormal resistance forces the blade to pivot inwardly and bear with said other corner portion against the backing element, the latter being a plate having a concave track opposite said other corner portion, and said means comprising a pivot attaching the plate to the support.

References Cited in the file of this patent

UNITED STATES PATENTS

| | | |
|---|---|---|
| 2,529,797 | Cauble | Nov. 14, 1950 |
| 2,529,870 | Golasky | Nov. 14, 1950 |
| 2,592,755 | Soenksen | Apr. 15, 1952 |
| 2,654,986 | Gold | Oct. 13, 1953 |

FOREIGN PATENTS

| | | |
|---|---|---|
| 17,103 | Australia | Nov. 26, 1929 |